United States Patent [19]
Shutterly et al.

[11] Patent Number: 4,688,260
[45] Date of Patent: Aug. 18, 1987

[54] HIGH-RELIABILITY FIBER OPTIC REPEATER

[75] Inventors: Harold B. Shutterly, Edgewood Boro; Joseph S. Malingowski, Wilkins Township, Allegheny County, both of Pa.

[73] Assignee: Westinghouse Electric Corp., Pittsburgh, Pa.

[21] Appl. No.: 785,815

[22] Filed: Oct. 9, 1985

[51] Int. Cl.$^4$ .............................................. H04B 9/00
[52] U.S. Cl. .................................... 455/601; 455/607; 455/612
[58] Field of Search ............... 455/601, 605, 606, 607, 455/612

[56] References Cited

U.S. PATENT DOCUMENTS

| | | | |
|---|---|---|---|
| 4,027,153 | 5/1977 | Käch | 455/607 |
| 4,227,260 | 10/1980 | Vojvodich et al. | 455/601 |
| 4,233,589 | 11/1980 | Rawson et al. | 455/612 |
| 4,246,475 | 1/1981 | Altman | 455/612 |
| 4,406,513 | 9/1983 | Raphael | 350/96.16 |
| 4,457,581 | 7/1984 | Johnson et al. | 455/612 |
| 4,566,134 | 1/1986 | Harbour et al. | 455/607 |

OTHER PUBLICATIONS

AMP Incorporated catalog, "Optimate Fiber Optic Interconnection System," issued 3-85, cover and pp. 53-54.

*Primary Examiner*—Robert L. Griffin
*Assistant Examiner*—Leslie Van Beek
*Attorney, Agent, or Firm*—Daniel C. Abeles

[57] ABSTRACT

A T-connection fiber-optical repeater employs redundant electrical-to-optical converters for generating optical signals to be distributed to terminal devices connected the repeater, and redundant optical-to-electrical converters for receiving optical signals from the terminal devices. Reliability is markedly increased by including one or two mixing stars in the fiber system between the converter and the repeaters. The number of converters and supporting circuitry that is needed can be reduced by coupling more than one fiber from the star or stars to each converter. The reliability of the repeater can be further enhanced by using redundant optical-to-electrical converters to receive optical signals from other repeaters and by using redundant electrical-to-optical converters to emit optical signals to other repeaters. Monitoring optical-to-electrical converters can be coupled to the stars in order to detect failure of electrical-to-optical converters connected to the stars.

19 Claims, 10 Drawing Figures

HIGH-RELIABILITY FIBER OPTIC REPEATER

BACKGROUND OF THE INVENTION

The present invention is directed to a highly reliable fiber optic repeater, and more particularly to a repeater for use in a multi-star T-connection network. The repeater is particularly useful in industrial control and sensing applications.

Continuing improvements in the transmission quality of optical fibers, and in particular increased bandwidth and reduced attenuation rates, have made optical fiber communication networks an increasingly attractive alternative to networks which employ conductors as the transmission medium. Moreover, optical networks are intrinsically insensitive to electromagnetic noise. In order to communicate optically, an electrical signal developed within a terminal device such as, for example, a telephone, computer, or numerically controlled machine tool, is delivered to an optical transmitter within the terminal device. The optical transmitter uses the electrical signal to modulate light from a source such as an LED or laser diode. Assuming that the electrical signal developed within the terminal device is a digital signal in serial form, the modulation is typically conducted by using the electrical signal to flash the LED or laser diode ON or OFF, thereby generating the optical equivalent of the electrical signal. The modulated light is transmitted via an optical fiber to an optical receiver within another terminal device. The optical receiver includes an optical detector, such as a photodiode, which re-converts the modulated optical signal into an electrical signal. Thus the optical transmitters and optical receivers within the terminal devices, together with the optical fibers connecting them, effectively replace conductors which might otherwise have been used. A communication protocol is typically used to limit access to the network so that only one terminal device at a time can transmit. Such protocols (e.g., token passing) are known in the art and may be implemented within the electronics of the terminal devices.

A fiber-optics star is a passive hub used for collecting optical signals from a number of input fibers or for distributing optical signals to a number of output fibers. Both transmissive and reflective stars are known. The physical structure of a transmissive star is illustrated schematically in FIG. 1, wherein four optical fibers had been fused at a tapered region 20 to provide a star 22 having first ports 24, 26, 26, and 30, and second ports 32, 34, 36, and 38. Light entering star 22 through any of the first ports 24-30 is equally distributed to all of the second ports 32-38. For example, if light having an intensity of one unit were introduced into first port 24, light having an intensity of a quarter unit (neglecting minor losses) would be emitted through each of second ports 32-38. Star 22 is bi-directional; for example, light entering second port 36 would be equally distributed to first ports 24-30. Despite its bi-directional nature it is frequently convenient to refer to a star's light "input" and light "output" fibers, which is determined by how the star is oriented when it is installed for use.

Star 22 could be used to interconnect four terminal devices, each terminal device being separately connected via optical fibers to one of the first ports 24-30 and to one of the second ports 32-38. In this configuration star 22 is appropriately deemed a "mixing" star since it serves to collect optical signals from all of the terminal devices and distribute optical signals to all of the terminal devices. Mixing stars are not limited to four pairs of ports, as in the example of FIG. 1, but instead typically service from 16 to 64 terminal devices. Moreover, the basic structure of FIG. 1 could be modified to provide a collection star or a distribution star. To provide a 4-to-1 "collection" star, all of the first ports and one of the second ports, or vice versa, would be used. For example, each of the first ports 24-30 would be connected to respective sources of optical signals and one of the second ports, for example port 32, would be used to convey the collected signals, with the remaining second ports, 34-38, being terminated in a non-reflective manner. The same structure could be used in reverse, with port 32 being coupled to a signal source, as a 1-to-4 "distribution" star. Small collection or distribution stars are also known as "optical couplers."

A combination of passive stars and active repeaters is required in forming large fiber-optic networks. Since each repeater services one or more stars, the failure of a repeater—even if provisions are made for passively bypassing it—essentially disconnects one or more stars and the terminal devices connected thereto from the network. This represents an unacceptable communication loss in an industrial environment. Consequently, very high repeater reliability is essential.

SUMMARY OF THE INVENTION

Accordingly, a primary object of the invention is to provide a high-reliability fiber optic repeater.

Another object of the invention is to provide a T-connection repeater having redundant optical channels in order to increase reliability.

Another object of the invention is to provide a T-connection repeater which employs stars to reliably support a plurality of local terminal devices connected to the repeater and to decrease the number of active optical and electronic components required.

Another object of the present invention is to provide a highly-reliable T-connection repeater having provisions for detection of a malfunction.

Another object of the present invention is to provide a highly reliable T-connection repeater having redundancies and monitoring provisions which permit the use of laser diodes in a practical fiber optic network in order to improve operating speed.

These and other objects can be attained, in a network which includes first and second fibers, by providing a repeater having a first network receiver means for receiving optical signals from the first fiber and having a local transmitter means for emitting light in response to electrical signals generated by the first receiver means. The local transmitter means includes a plurality of electrical-to-optical converters and a mixing star, each electrical-to-optical converter being exposed to at least one light input fiber of the mixing star. The light output fibers of the mixing star are operatively connected to optical receivers in terminal devices. The repeater also has a local receiver means which is operatively connected to the optical transmitters in the terminal devices, and a first network transmitter means for emitting optical signals to the second fiber of the network in response to electrical signals generated by the local receiver means. In a preferred embodiment the network also includes third and fourth fibers and the repeater includes an additional network receiver means coupled to the third fiber and an additional network transmitter means coupled to the fourth fiber.

DESCRIPTION OF THE PREFERRED EMBODIMENT

Figure 2:
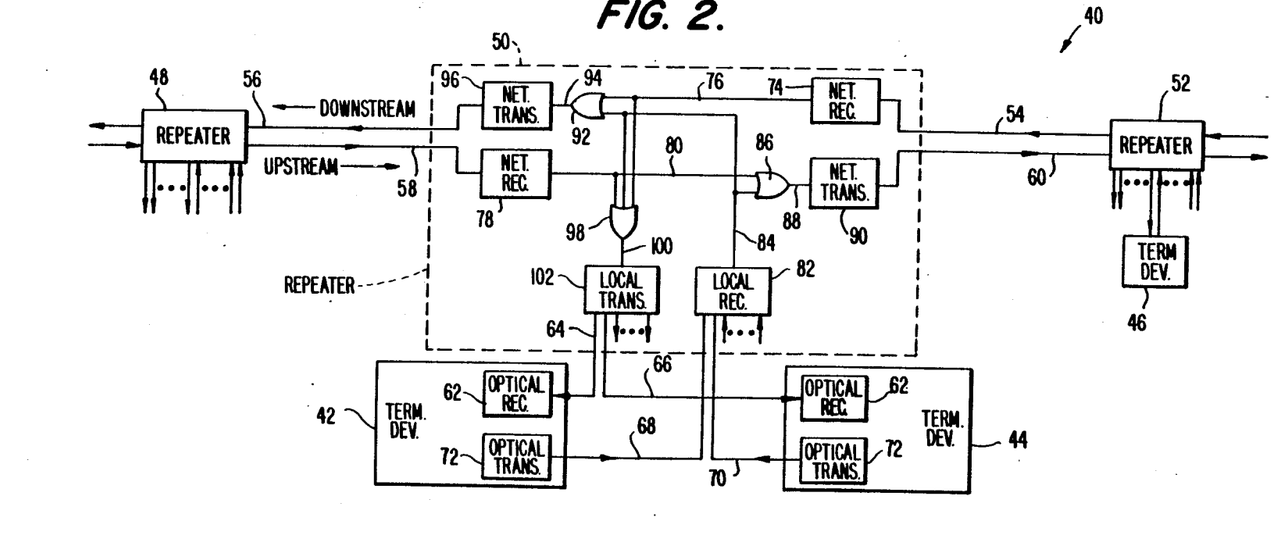
FIG. 2 schematically illustrates an embodiment of the repeater of the present invention in a fiber optic network.

FIG. 2 illustrates a network 40 for optical communication among a plurality of terminal devices, of which only terminal devices 42, 44, and 46 are illustrated. Network 40 includes T-connection repeaters 48, 50, and 52, and optical fibers connecting them in the upstream and downstream directions as illustrated. Repeater 50 receives signals traveling downstream from repeater 52 via fiber 54 and transmits signals downstream to repeater 48 via fiber 56. Signals traveling upstream from repeater 48 are received by repeater 50 via fiber 58, and repeater 50 transmits signals upstream to repeater 52 via fiber 60. In addition to these network fiber connections, repeater 50 is locally connected to the optical receivers 62 of terminal devices 42 and 44 via fibers 64 and 66, respectively. Similarly, fibers 68 and 70 connect the optical transmitters 72 of terminal devices 42 and 44 to repeater 50. As the dots in FIG. 2 suggest, repeater 50 typically supports a greater number of terminal devices than the two illustrated.

With continuing reference to FIG. 2, downstream network receiver 74 receives digital optical signals in serial form from fiber 54 and provides the equivalent electrical signals on conductor 76. Upstream network receiver 78 similarly receives optical signals from fiber 58 and provides the electrical equivalent thereof on conductor 80. Local receiver 82 provides an electrical output, on conductor 84, corresponding to the optical signals received from terminal devices 42 and 44. Gate 86 OR's the electrical signals on conductors 80 and 84 to provide an input signal on conductor 88 for upstream network transmitter 90, which emits corresponding flashes of lights to fiber 60. In a similar manner gate 92 OR's the signals on conductors 76 and 84 to provide an input on conductor 94 to downstream network transmitter 96, which emits corresponding optical signals to fiber 56. Gate 98 OR's the signals on conductor 76, 80, and 84 to provide an input on conductor 100 for local transmitter 102, which emits optical signals via fibers 64 and 66 to terminal devices 42 and 44.

The general operation of repeater 50 will now be described. An optical signal traveling downstream on fiber 54 is converted to electrical form by receiver 74, passes through gate 92, and is transformed back to optical form by transmitter 96 for further progress downstream on fiber 56. The electrical signal also passes through gate 98 to transmitter 102, which provides the optical equivalent to terminal devices 42 and 44. Similarly, an optical signal traveling upstream on fiber 58 is converted to electrical form by receiver 78, and provided via gate 86 to transmitter 90 for further transmission upstream and via gate 98 to transmitter 102 for local distribution. On the other hand an optical signal that is developed locally by terminal device 42 or 44 is converted to electrical form by local receiver 82, and the electrical signal passes through gate 86 to transmitter 90 for optical transmission upstream, passes through gate 92 to transmitter 96 for optical transmission downstream, and passes through gate 98 to transmitter 102 for local distribution. In short, it will be apparent that repeater 50 permits terminal device 42, for example, to address a message locally to terminal device 44 or to receive a message from terminal device 44. Repeater 50 also permits terminal device 42 to send and receive messages from terminal devices connected to other repeaters, such as terminal device 46.

Figure 3:
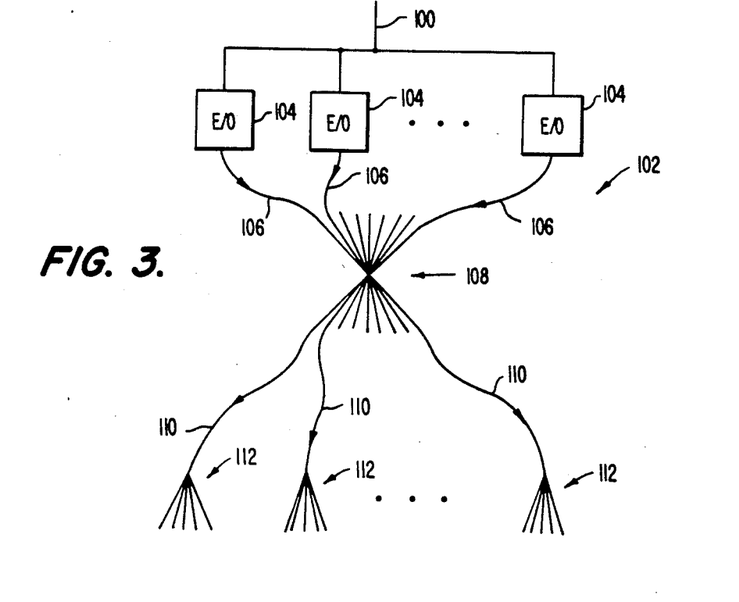
FIG. 3 schematically illustrates an embodiment of the local transmitter in the repeater of FIG. 2.

Turning next to FIG. 3, local transmitter 102 includes N electrical-to-optical converters 104, such as LED's or laser diodes, which are connected in parallel to conductor 100. The optical output of each converter 104 is received by a light input fiber 106 of an N-input, N-output mixing star 108. The light output fibers 110 of star 108 are connected to N 1-to-16 distribution stars 112. Each distribution star 112 conveys signals to the optical receivers 62 (see FIG. 2) of a plurality of terminal devices. Stars 112 need not be physically close to mixing star 108 and/or converters 104; in practice stars 112 (and the distribution and collection stars to be discussed hereafter) would typically be dispersed at convenient locations among the terminal devices they serve.

The number of terminal devices that can be serviced by a single converter 104 is limited by signal-to-noise ratio requirements in the optical receivers 62, which have a minimum power input requirement for successful reception. Using standard, low-cost optical components and using receivers 62 having a bandwidth sufficient to pass 100 nanosecond pulses with good fidelity, a single LED light source can provide optical power for at least sixteen optical receivers 62, with an adequate optical power margin for variations in source power and transmission loss. The 16-to-1 ratio could be attained, in the absence of star 108, by connecting stars 112 directly to respective converters 104. If star 108 were omitted, however, the failure of a converter 104 would disrupt communication with the sixteen terminal devices connected to it. The inclusion of mixing star 108 greatly increases reliability. Star 108 could, for example, be a 16-input, 16-output star connected between sixteen converters 104 and sixteen distribution stars 112. The optical signal power into each distribution star 112 would then consist of 1/16 of the output power from each of the sixteen converters 104. The optical power provided to each star 112 would therefore be the same, except for small losses in star 108, as would be obtained by directly connecting each converter 104 to a respective star 112. However the failure of any one converter 104 would, rather than cutting off communication to the respective star 112 altogether, only reduce the signal to each star 112 to 15/16ths of full power. Assuming at least a 3 dB safety factor in the optical power budget for network 40, eight of the converters 104 would have to fail when star 108 is included before communications would be affected. Moreover, it will be apparent that financial savings could be achieved by using fewer than sixteen converters 104 when the equipment is built, with the excess light input fibers 106 being terminated and left idle.

Laser diodes typically have a faster response than LED's and their output signals are far more coherent. However a laser diode is less reliable than a LED by perhaps a factor of 10. It will be apparent that the increased reliability afforded by star 108 facilitates the use of laser diodes in network 40.

Figure 4:
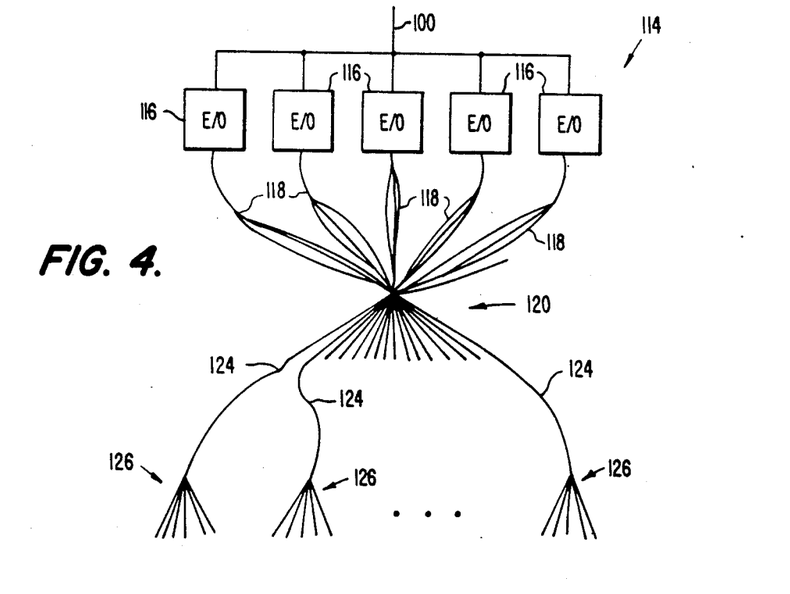
FIG. 4 schematically illustrates an alternative embodiment of the local transmitter in the repeater of FIG. 2.
Figure 8:
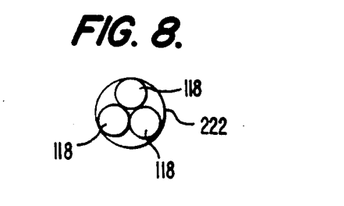
FIG. 8 schematically illustrates three fibers grouped to receive optical signals from the active region of an LED.

FIG. 4, which illustrates a local transmitter 114 that can be used in lieu of transmitter 102 in FIG. 3, shows a further advantage of adding a mixing star: it can be used to reduce the number of electrical-to-optical converters required. In FIG. 4 five electrical-to-optical converters 116 are connected in parallel to conductor 100. Each converter 116 provides light to three input fibers 118 of 16-to-16 mixing star 120. FIG. 8 illustrates a bundle of three fibers 118 exposed to the active area of an LED 222, serving as an electrical-to-optical converter. The output fibers 124 of star 120 are connected to 16 1-to-16 distribution stars 126.

Bundling the star's input fibers, as in the embodiment of FIGS. 4 and 8, requires that the active area of the converter 116 be sufficiently large relative to the cross-sectional fiber area. In a test of one LED, the Motorola MFOE 1202, it has been found that three fibers can be driven with 70% efficiency relative to a single fiber. Since the optical power in all of the bundles is summed in mixing star 120, small variations in the amount of light coupled into one or more fibers or bundles is not critical. If five converters 116 are used, the failure of one converter would reduce the power input into each star 126 only to 80% of the normal power level. It should be noted that laser diodes which are currently available typically have smaller light-emitting regions than LEDs, so that bundling in the manner of FIG. 8 is not currently feasible with laser diodes unless one resorts to diverging lenses or other complications.

Figure 5:
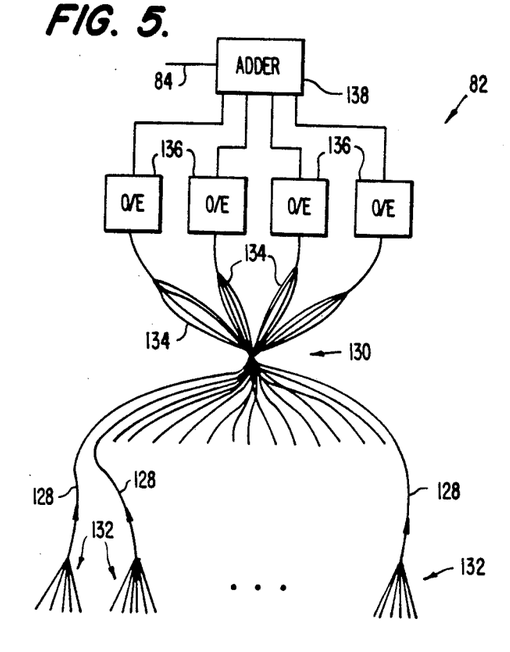
FIG. 5 schematically illustrates the local receiver in the repeater of FIG. 2.

FIG. 5 illustrates a local receiver 82 which, like the local transmitters 102 and 114 previously discussed, also uses a mixing star, but in the reverse process of accumulating signals from terminal devices. In FIG. 5, each input fiber 128 of 16-to-16 mixing star 130 receives optical signals from a respective one of sixteen 16-to-1 collection stars 132. Each of the sixteen input fibers of a star 132 receives optical signals from a respective optical transmitter 72 (see FIG. 2). The output fibers 134 from star 130 are grouped in bundles of four and exposed to optical-to-electrical converters 136, thereby reducing the number of converters that would otherwise be needed. Converters 136 provide electrical input signals for adder 138, which produces an output signal on conductor 84. Although four comparators whose outputs are connected to an OR gate could be used, adder 138 preferably adds the electrical outputs of converters 136 in order to fully utilize the signal energy. For example, adder 134 may be a summing amplifier followed by a buffer with hysteresis characteristics.

It will be apparent that mixing star 130, like star 120 in FIG. 4, provides increased reliability while reducing the number of converters that are needed. In an experiment with one particular optical-to-electrical converter, the Motorola MFOD 1100, it has been found that four fibers can be bundled with no loss of efficiency relative to single fiber coupling. With multiple converters, the failure of any one converter does not disrupt communication with any of the terminal devices. In addition, the outputs of the converters can be monitored and compared to detect a failed converter.

Figure 6:
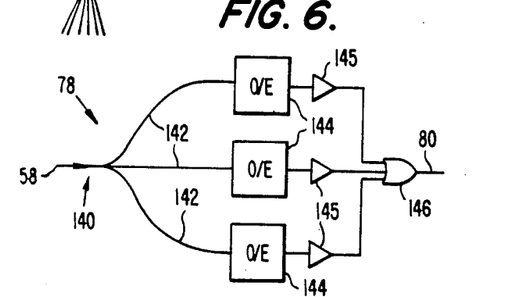
FIG. 6 schematically illustrates a network receiver in the repeater of FIG. 2.

FIG. 6 illustrates upstream network receiver 78, although an identical configuration can be used for receiver 74. In FIG. 6, fiber 58 is coupled to a 1-to-3 distribution star 140, whose output fibers 142 shine light on optical-to-electrical converters 144. The received power levels will generally be high enough that the outputs of converters 144 need not be summed to enhance the signal-to-noise ratio; each output can be used independently in a redundant configuration. Accordingly, the outputs are provided to buffers 145 having hysteresis characteristics, and then to an OR gate 146 whose output is applied to conductor 80.

Figure 7:
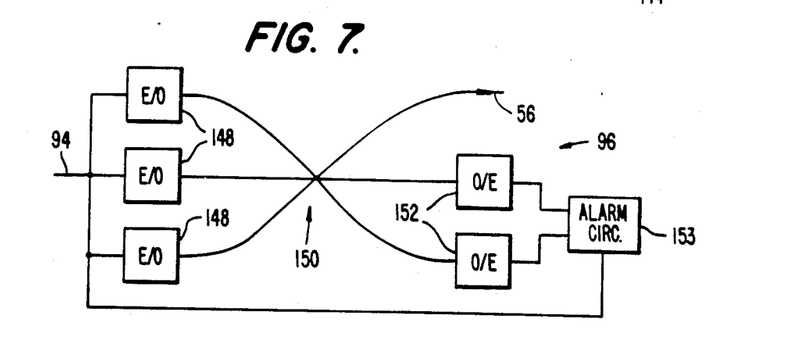
FIG. 7 illustrates a network transmitter in the repeater of FIG. 2.

FIG. 7 illustrates downstream network transmitter 96, although the configuration of transmitter 90 can be the same. In FIG. 7 three electrical-to-optical converters 148 receive electrical signals from conductor 94 and provide optical signals to respective input fibers of 3-to-3 mixing star 150. Fiber 56 (see FIG. 2) is one of the output fibers of star 150, the remaining two output fibers being connected to redundant optical-to-electrical converters 152. Converters 152 are connected to an alarm circuit 153 for monitoring the optical signal level in order to detect malfunction of converters 148. Circuit 153 emits an alarm signal if neither of converters 152 produces a suitably high signal when a digital "1" is present on conductor 94.

Figure 9:
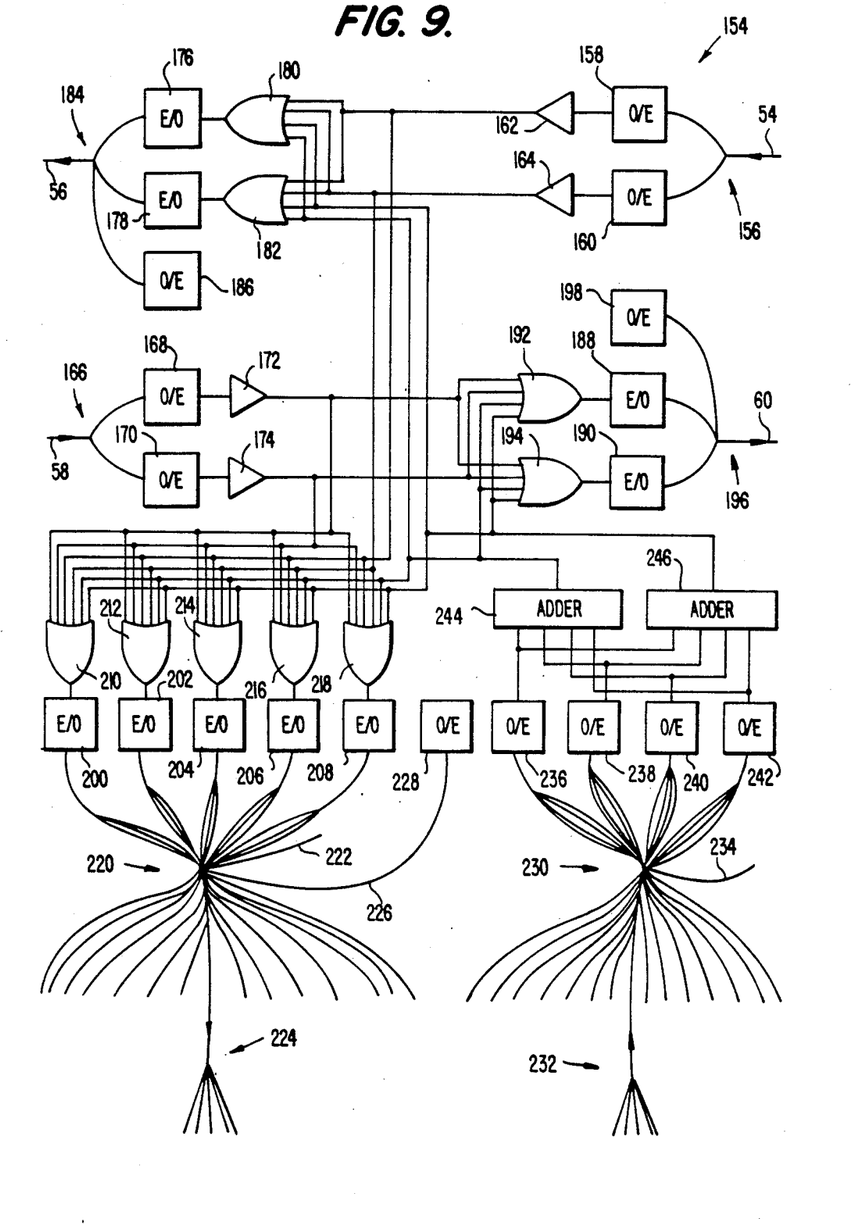
FIG. 9 schematically illustrates a second embodiment of the repeater of the present invention.

FIG. 9 illustrates a T-connection repeater 154 which can be used in network 40 (see FIG. 2) in lieu of repeater 50. Repeater 154 includes a 1-to-2 distribution star 156 which receives optical signals from fiber 54 and distributes them to optical-to-electrical converters 158 and 160, which respectively provide electrical outputs to buffers 162 and 164 having hysteresis characteristics. Similarly, 1-to-2 distribution star 166 receives optical signals from fiber 58 and provides them to optical-to-electrical converters 168 and 170, which are respectively connected to buffers 172 and 174 having hysteresis characteristics. Electrical-to-optical converters 176 and 178, which are driven respectively by OR gates 180 and 182, provide optical signals for the input fibers of 2-to-2 mixing star 184. One of the output fibers of star 184 is coupled to fiber 56, while the other output fiber conveys light to optical-to-electrical converter 186. Alarm circuitry (not illustrated) connected to converter 186 and the output of gate 182 (or to the outputs of both gates 180 and 182 for dual redundancy) monitors the light output of converters 176 and 178 to detect a converter failure. Electrical-to-optical converters 188 and 190, which are driven respectively by OR gates 192 and 194, provide optical signals for 2-to-2 mixing star 196. One light output fiber of star 196 is coupled to fiber 60, while the other fiber conducts light to optical-to-electrical converter 198 which, like converter 186, is provided to monitor operation.

With continuing reference to FIG. 9, electrical-to-optical converters 200, 202, 204, 206, and 208 are driven respectively by OR gates 210, 212, 214, 216, and 218. The light input fibers of 16-to-16 mixing star 220 are bundled in groups of three and exposed to the optical signals emitted by converters 200-208, with the sixteenth input fiber 222 being terminated in a nonreflecting manner. Fifteen of the sixteen output fibers from star 220 are connected to 1-to-16 distribution stars 224, the output fibers of which provide signals for the optical receivers 62 (see FIG. 1) in 240 terminal devices. The sixteenth output fiber 226 conveys light to optical-to-electrical converter 228, which is connected to alarm circuitry (not illustrated) for monitoring the operation of converters 200-208 in the manner previously described. Fifteen of the sixteen light input fibers of mixing star 230 receive light from 1-to-16 collection stars 232, the sixteenth input fiber 234 being terminated in a non-reflecting manner. The input fibers of stars 232 are connected to the optical transmitters 72 (see FIG. 2) of the 240 terminal devices. The output fibers of star 230 are grouped in bundles of four and exposed to optical-to-electrical converters 236, 238, 240, and 242. Adders 244 and 246, which may be summing amplifiers followed by buffers with hysteresis characteristics, have four inputs each, and each input receives the electrical signal generated by one of the converters 236-242.

With continuing reference to FIG. 9, gates 180 and 182 OR the outputs of buffer 162, buffer 164, adder 246, and adder 244. Gates 192 and 194 OR the outputs of buffer 172, buffer 174, adder 244, and adder 246. Gates 210-218 OR the output of buffers 162, 164, 172, and 174 and the output of adders 244 and 246. It will be apparent that an optical signal propagating downstream on fiber 54 is detected by converters 158 and 160 and that the resulting electrical signal passes through gates 180 and 182 to converters 176 and 178, which re-convert the signal to optical form for further transmission downstream via fiber 56. The electrical signal also passes through gates 210-218 to converters 200-208, which emit optical signals to mixing star 200 for subsequent transmission via distribution stars 224 to each of the 240 local terminal devices. In a similar manner, an optical signal traveling upstream on fiber 58 is conveyed further upstream on fiber 60 and is provided to the local terminal devices via mixing star 220. On the other hand optical signals from the local terminal devices are collected by stars 232, mixed by star 230, transformed into electrical form by converters 236-240, and summed by adders 244-246. The summed electrical signals pass through gates 160 and 162 to provide an optical signal propagating downstream on fiber 56, pass through gates 192 and 194 to provide an optical signal propagating upstream on fiber 60, and pass through gates 210-218 to provide optical signals for the local terminal devices.

Figure 1:
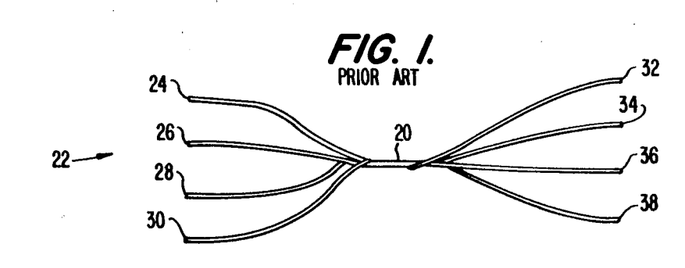
FIG. 1 is a plan view of a 4-to-4 transmissive mixing star.

Comparing FIGS. 2 and 9, it will be seen that the embodiment of FIG. 9 employs two OR gates 180 and 182 where only one (92) was used in the embodiment of FIG. 1, etc. Such electrical redundancy enhances reliability since the possible failure of a gate or other component will not reduce repeater 154 to inoperability.

Figure 10:
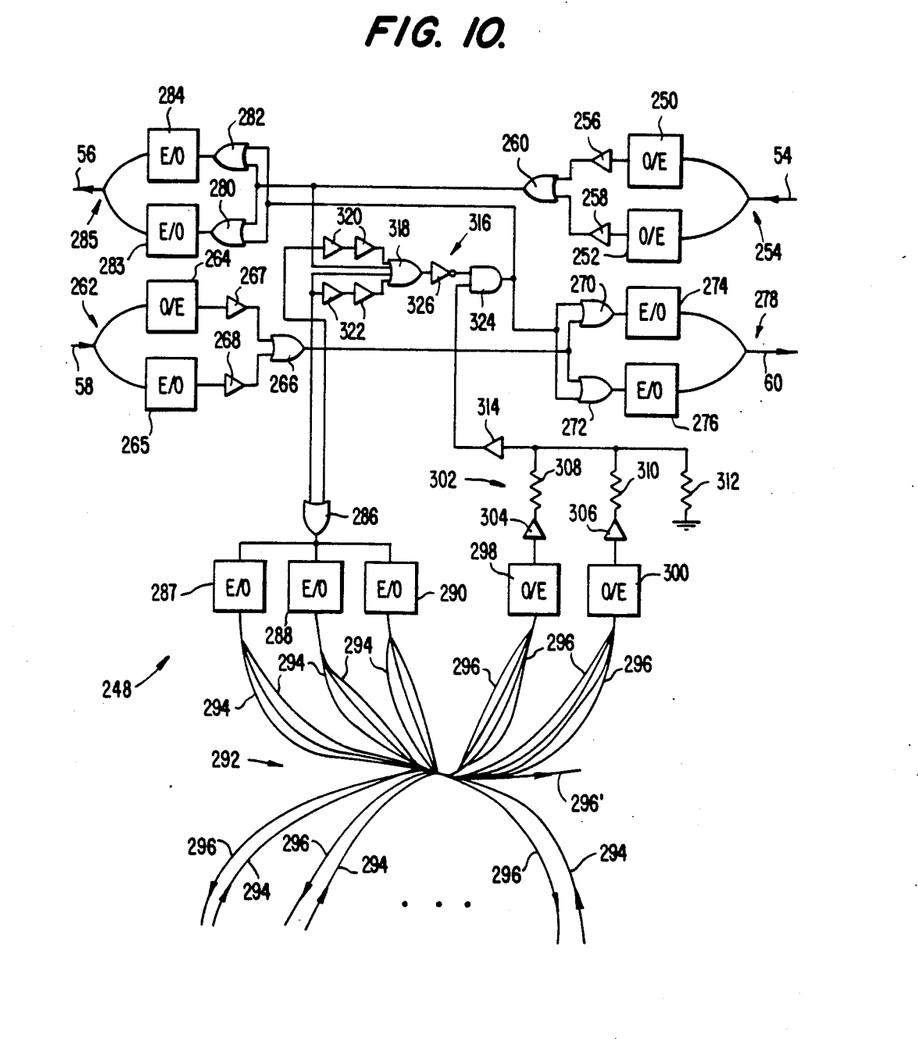
FIG. 10 schematically illustrates a third embodiment of the repeater of the present invention.

While the embodiment of FIG. 9 achieves improved reliability and a decreased number of components by, inter alia, linking the local terminal devices to converters through a pair of mixing stars, this would become unduly expensive if the number of local terminal devices to be serviced is relatively small. FIG. 10 illustrates a T-connection repeater 248 which can be used in network 40 (see FIG. 2) in lieu of repeater 50 in the event that the number of local terminal devices to be serviced is relatively small.

In FIG. 10, optical signals moving downstream on fiber 54 are provided to optical-to-electrical converters 250 and 252 by 1-to-2 distribution star 254. The electrical output signals of converters 250 and 252 are provided to buffers 256 and 258 having hysteresis characteristics, and the outputs of buffers 256 and 258 are in turn provided to OR gate 260. Similarly, 1-to-2 distribution star 262 conveys upstream-propagating optical signals from fiber 58 to optical-to-electrical converters 264 and 265, the outputs of these converters being conveyed to OR gate 266 via buffers 267 and 268 having hysteresis characteristics. OR gates 270 and 272 provide signals to drive electrical-to-optical converters 274 and 276, the optical outputs of which are coupled to fiber 60 by 2-to-1 collection star 278. OR gates 280 and 282 provide output signals for driving electrical-to-optical converters 283 and 284, which provide corresponding optical signals that are coupled to fiber 56 by 2-to-1 distribution star 285.

With continuing reference to FIG. 10, one input of OR gate 286 is connected to the output of gate 260 and the other input of gate 286 is connected to the output of gate 266. Electrical-to-optical converters 267, 288, and 290 are connected in parallel to the output of gate 286. A 64-to-64 mixing star 292 has 64 light input fibers 294 and a like number of output fibers 296. Nine of the input fibers 294 are bundled in groups of three and exposed to light emitted by converters 287-290. Eight of the output fibers 296 are bundled in groups of four and coupled to optical-to-electrical converters 298 and 300. One output fiber (identified by reference number 296') is terminated in a non-reflecting manner. The remaining 55 input fibers 294 and 55 output fibers 296 are paired, one fiber of each pair being coupled to an optical receiver 62 (see FIG. 2) of a terminal device and the other fiber of each pair being coupled to the optical transmitter 72 of the same terminal device.

An adder 302 receives the electrical output signals from converters 298 and 300. Adder 302 includes amplifiers 304 and 306 for boosting the outputs of converters 298 and 300, a summing circuit which includes resistors 308, 310, and 312, and a buffer 314 which has hysteresis characteristics and which is responsive to the potential at the summing point of the resistor network. The output of buffer 314 is provided, via an inhibit circuit 316 which will be discussed in more detail momentarily, to inputs of gates 270, 272, 280, and 282.

With continuing reference to FIG. 10, gate 260 turns ON when converters 250 and 252 receive a flash of light traveling downstream on fiber 54, whereupon gates 280, 282, and 286 also turn ON. Consequently, an optical signal is propagated further downstream on fiber 56 and is delivered to the local terminal devices (not illustrated) that are connected to star 292. Similarly, upon receipt of an optical signal propagating upstream on fiber 58, repeater 248 emits a signal traveling further upstream on fiber 60 and emits signals to the local terminal devices connected to star 292. When one of these local terminal devices emits a signal, the signal is conveyed to the remaining local terminal devices by star 292 itself. Furthermore, adder 302 responds with a signal that is gated through inhibit circuit 316 to gates 270, 272, 280, and 282, so that the signal is transmitted upstream on fiber 60 and downstream on fiber 56.

When converters 287-290 are illuminated in response to a signal traveling downstream on fiber 54 or upstream on fiber 58, the output fibers 296 of star 292 carry the signals not only to the local terminal devices (not illustrated) connected to star 292, but also to converters 298 and 300. In effect, star 292 essentially "reflects" the signals from converters 297-290 to converters 298-300, so that converters 298-300 respond as through they had received legitimate signals from the local terminal devices connected to star 292. Without inhibit circuit 316, spurious signals arising from such reflection would be propagated upstream on fiber 60 and downstream on fiber 56. These spurious signals would degrade communication substantially and might even prevent communication altogether by establishing optical oscillations in network 40. Inhibit circuit 316 avoids this undesirable result.

With continuing reference to FIG. 10, inhibit circuit 316 includes a 4-input OR gate 318. One input of gate 318 is connected directly to the output of gate 260, another input is connected to the output of gate 260 through a delay circuit consisting of a pair of series-connected buffers 230, the third input of gate 318 is connected directly to the output of gate 266 and, finally, the last input is connected to the output of gate 266 through a delay circuit consisting of a pair of buffers 322. It will be apparent that gate 318 turns ON when either of gates 260 or 266 turns ON and that gate 318 remains ON briefly after the gate 260 or 266 turns OFF due to the presence of the delay circuits. The output of gate 318 is connected to an input of AND gate 324 through inverter 326, so that gate 324 is OFF when optical pulses traveling upstream or downstream on network 40 traverse repeater 248. Thus, reflections caused by star 292 are curtailed by gate 324 of inhibit circuit 316. Inverter 326 is ON when optical pulses are not traveling upstream or downstream through repeater 248, so that the local terminal devices connected to star 292 can generate signals for propagation throughout network 40. The delay circuits formed by buffers 320 and 322 are present because, without them, the trailing edge of a pulse traveling upstream or downstream might briefly precede the trailing edge of the corresponding reflection from star 292.

Since there are three electrical-to-optical converters (287-290) which are illuminated when optical signals travel upstream or downstream through repeater 248, and since each of these converters is coupled to three input fibers 294, normally the signal at the summing point in adder 302 is greater during signal reflection than during transmission of a message by a local terminal device (not illustrated). Accordingly, in lieu of inhibit circuit 316 it will be apparent that an inhibit means which prevents signals exceeding a predetermined threshold from reaching buffer 314 could be used.

Although the embodiment of FIG. 10 could be rendered inoperative by the failure of a single gate (e.g., gate 260), it will be apparent that electrical redundancy in the manner of the embodiment of FIG. 9 could be employed. Moreover, the electrical components of the various repeater embodiments disclosed herein are preferably powered by redundant power supplies in order to decrease the risk of communication failure due to a power supply failure.

From the foregoing discussion it will be apparent that the present invention provides a T-connection fiber-optical repeater which employs one or more mixing stars between terminal devices connected to the repeater and electrical-to-optical and optical-to-electrical converters in the repeater. Reliability can also be augmented by employing redundant optical-to-electrical converters to detect signals emitted from other repeaters and redundant electrical-to-optical converters to emit signals to other repeaters. The improved performance of the repeater permits laser diodes to be used in the network without subjecting the network to excessive communications failure. Furthermore the stars employed in the repeater facilitate monitoring for component failure.

It will be understood that the above description of the present invention is susceptible to various modifications, changes and adaptations, and the same are intended to be comprehended within the meaning and range of equivalents of the appended claims.

We claim:

1. A fiber-optic repeater for connection to a plurality of terminal devices in a network having a first fiber and a second fiber, each terminal device having an optical receiver portion and an optical transmitter portion, comprising:
   first network receiver means for receiving optical signals from said first fiber and generating electrical signals corresponding thereto;
   local transmitter means for emitting light in response to said electrical signals generated by said first receiver means, said local transmitter means including a plurality of local electrical-to-optical converters and a mixing star having a plurality of light input fibers and a plurality of light output fibers, each local electrical-to-optical converter being optically coupled to at least one of said light input fibers and the optical receiver portions of said terminal devices being operatively connected to said light output fibers;
   local receiver means operatively connected to the optical transmitter portions of said terminal devices for generating electrical signals in response to optical signals from said optical transmitter portions; and
   first network transmitter means for emitting optical signals to said second fiber in response to electrical signals generated by said local receiver means.

2. The repeater of claim 1, wherein the number of local electrical-to-optical converters is the same as the number of light input fibers of said mixing star, each local electrical-to-optical converter being optically coupled to a single light input fiber.

3. The repeater of claim 2, wherein said local transmitter means further comprises a plurality of distribution stars, each distribution star being connected to a respective light output fiber of said mixing star, the optical receiver portions of said terminal devices being operatively connected to said light output fibers through said distribution stars.

4. The repeater of claim 1, wherein the number of local electrical-to-optical converters is less than the number of light input fibers of said mixing star, each local electrical-to-optical converter being optically coupled to at least one light input fiber.

5. The repeater of claim 1, wherein the number of local electrical-to-optical converters is less than the number of light input fibers of said mixing star, each local electrical-to-optical converter being optically coupled to a plurality of light input fibers.

6. The repeater of claim 5 wherein said local transmitter means further comprises a plurality of distribution stars, each distribution star being connected to a respective light output fiber of said mixing star, the optical receiver portions of said terminal devices being oeratively connected to said light output fibers through said distribution stars.

7. The repeater of claim 6, further comprising a local monitoring optical-to-electrical converter optically coupled to one of the light output fibers of said mixing star, and means connected to said local monitoring optical-to-electrical converter for monitoring the performnace of said local electrical-to-optical converters.

8. The repeater of claim 1, wherein said local receiver means comprises a plurality of local optical-to-electrical converters, means for combining the electrical outputs of said local optical-to-electrical converters, and an additional mixing star having a plurality of light input fibers and a plurality of light output fibers, each local optical-to-electrical converter being optically coupled to at least one light output fiber of said additional mixing star, the optical transmitter portions of said terminal devices being operatively connected to the light input fibers of said additional mixing star.

9. The repeater of claim 8, wherein the number of local optical-to-electrical converters is less than the number of light output fibers of said additional mixing star, each local optical-to-electrical converter being optically coupled to a plurality of light output fibers of said additional mixing star.

10. The repeater of claim 9, wherein said local receiver means further comprises a plurality of collection stars, each collection star being connected to a respective light input fiber of said additional mixing star, the optical transmitter portions of said terminal devices being operatively connected to the light input fibers of said additional mixing star through said collection stars.

11. The repeater of claim 1, wherein said local receiver means comprises a plurality of local optical-to-electrical converters and is operationally connected to said optical transmitter portions of said terminal devices through said mixing star, each local optical-to-electrical converter being optically coupled to at least one of said light output fibers of said mixing star and said optical transmitter portions being operatively connected to light input fibers of said mixing star, and further comprising inhibit means responsive to said electrical signals generated by said first network receiver means for inhibiting said first network transmitter means from responding to said electrical signals generated by said local receiver means whenever said first network receiver means receives optical signals from said first fiber.

12. The repeater of claim 1, wherein said network additionally includes third and fourth fibers and said repeater further comprises second network receiver means for receiving optical signals from said third fiber and generating electrical signals corresponding thereto, said local transmitter means and said first network transmitter means additionally being responsive to the electrical signals generated by said second network receiver means, and second network transmitter means for emitting optical signals to said fourth fiber in response to electrical signals generated by said first network receiver means and said local receiver means.

13. The repeater of claim 12, wherein said first network transmitter means comprises a further star having a plurality of light input fibers and at least one light output fiber, said at least one light output fiber of said further star being connected to said second fiber, and a plurality of first network electrical-to-optical converters, each first network electrical-to-optical converter being optically coupled to at least one light input fiber of said further star, and wherein said second network transmitter means comprises another star having a plurality of light input fibers and at least one light output fiber, said at least one light output fiber of said another star being connected to said fourth fiber, and a plurality of second network electrical-to-optical converters, each second network electrical-to-optical converter being optically coupled to at least one light input fiber of said another star.

14. The repeater of claim 13, wherein said further star and another star are mixing stars having a plurality of light output fibers, wherein said first network transmitter means further comprises means connected to a light output fiber of said further star for monitoring the performance of said first network electrical-to-optical converters, and wherein said second network transmitter means further copmrises means connected to a light output fiber of said another star for monitoring the perforance of said second network electrical-to-optical converters.

15. The repeater of claim 14, wherein said first network receiver means comprises a plurality of first network optical-to-electrical converters and a distribution star having a light input fiber connected to said first fiber and having a plurality of light output fibers, each optically coupled to a first network optical-to-electrical converter, and wherein said second network receiver means comprises a plurality of second network optical-to-electrical converters and a distribution star having a light input fiber connected to said third fiber and having a plurality of output fibers, each optically connected to a second network optical-to-electrical converter.

16. The repeater of claim 12, wherein the number of local electrical-to-optical converters is the same as the number of light input fibers of said mixing star, each local electrical-to-optical converter being optically connected to a single light input fiber.

17. The repeater of claim 12, wherein the number of local electrical-to-optical converters is less than the number of light input fibers of said mixing star, each local electrical-to-optical converter being optically connected to a plurality of light input fibers.

18. The repeater of claim 12. wherein said local receiver means comprises a plurality of local optical-to-electrical converters, means for combining the electrical outputs of said local optical-to-electrical converters, and an additional mixing star having a plurality of light input fibers and a plurality of light output fibers, each local optical-to-electrical converter being optically connected to at least one light output fiber of said additional mixing star, the optical transmitter portions of said terminal devices being operatively connected to the light input fibers of said additional mixing star.

19. The repeater of claim 12, wherein said local receiver means comprises a plurality of local optical-to-electrical converters and is operationally connected to said optical transmitter portions of said terminal devices through said mixing star, each local optical-to-electrical converter being optically connected to at least one of said light output fibers of said mixing star and said optical transmitter portions being operatively connected to light input fibers of said mixing star, and further comprising inhibit means responsive to said electrical signals generated by said first and second network receiver means for inhibiting said first and second network transmitter means from responding to said electrical signals generated by said local receiver means whenever said first or second network receiver means receives optical signals.

* * * * *